United States Patent
Huang et al.

(10) Patent No.: US 9,774,054 B2
(45) Date of Patent: Sep. 26, 2017

(54) ELECTRICITY STORAGE BATTERY

(71) Applicant: NISSIN ELECTRIC CO., LTD., Kyoto (JP)

(72) Inventors: Lan Huang, Kyoto (JP); Hiroshige Deguchi, Kyoto (JP); Toshihiro Miyazaki, Kyoto (JP); Shosuke Yamanouchi, Kyoto (JP)

(73) Assignee: NISSIN ELECTRIC CO., LTD., Kyoto (JP)

( * ) Notice: Subject to any disclaimer, the term of this patent is extended or adjusted under 35 U.S.C. 154(b) by 97 days.

(21) Appl. No.: 14/767,582

(22) PCT Filed: Mar. 21, 2013

(86) PCT No.: PCT/JP2013/057965
§ 371 (c)(1),
(2) Date: Aug. 12, 2015

(87) PCT Pub. No.: WO2014/147778
PCT Pub. Date: Sep. 25, 2014

(65) Prior Publication Data
US 2016/0020479 A1    Jan. 21, 2016

(51) Int. Cl.
*H01M 8/20* (2006.01)
*H01M 8/18* (2006.01)

(52) U.S. Cl.
CPC ............ *H01M 8/188* (2013.01); *H01M 8/20* (2013.01); *H01M 2300/0025* (2013.01); *Y02E 60/528* (2013.01)

(58) Field of Classification Search
CPC . H01M 8/188; H01M 8/20; H01M 2300/0025
See application file for complete search history.

(56) References Cited

U.S. PATENT DOCUMENTS 4,362,791 A * 12/1982 Kaneko ................. H01M 8/184
                                                    429/101
2001/0028977 A1* 10/2001 Kazacos ............. B60L 11/1879
                                                    429/105
2012/0171531 A1    7/2012 Park et al.

FOREIGN PATENT DOCUMENTS

| JP | S56-042970 | 4/1981 |
| JP | S57-009072 | 1/1982 |

(Continued)

OTHER PUBLICATIONS

"International Search Report (Form PCT/ISA/210)", dated Jun. 11, 2013, with English translation therof, pp. 1-4, in which four of the listed references (JP2011-210696A, JP2010-244972A, JPS62-15770A and WO2012/117543A1) were cited.

(Continued)

*Primary Examiner* — Maria J Laios
*Assistant Examiner* — Angela Martin
(74) *Attorney, Agent, or Firm* — Jianq Chyun IP Office

(57) ABSTRACT

An electricity storage battery is described, including an anode electrolyte solution 32 that contains a zinc redox material and an amine represented by a general formula (1) below:

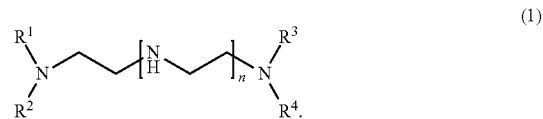

In the general formula (1), n is one of the integers 0 to 4, and each of $R^1$, $R^2$, $R^3$ and $R^4$ independently represents hydrogen, methyl or ethyl.

5 Claims, 3 Drawing Sheets

(56) References Cited

FOREIGN PATENT DOCUMENTS

| JP | S62-015770 | 1/1987 |
|----|------------|--------|
| JP | 2010-244972 | 10/2010 |
| JP | 2011-210696 | 10/2011 |
| WO | 2012/117543 | 9/2012 |

OTHER PUBLICATIONS

Y. H. Wen et al., "Studies on Iron ($Fe^{3+}/Fe^{2+}$)-Complex/Bromine ($Br_2/Br^-$) Redox Flow Cell in Sodium Acetate Solution", Journal of the Electrochemical Society, 153(5), Mar. 2006.

"Office Action of China Counterpart Application," issued on Aug. 31, 2016, with English translation thereof, p. 1-p. 13, in which the listed reference was cited.

\* cited by examiner

FIG.1

Concentration (mol/L) of Zn(II)-TETA complex

ELECTRICITY STORAGE BATTERY

CROSS-REFERENCE TO RELATED APPLICATION

This application is a 371 application of the International PCT application serial no. PCT/JP2013/057965, filed on Mar. 21, 2013. The entirety of the above-mentioned patent application is hereby incorporated by reference herein and made a part of this specification.

BACKGROUND OF THE INVENTION

Field of the Invention

The invention relates to an electricity storage battery, such as a redox flow battery.

Description of the Related Art

In the prior art, an electrolyte solution for use in an electricity storage battery is known to contain a metal redox material and a chelating agent (refer to Patent Documents 1 and 2 and Non-Patent Document 1). Patent Document 1 discloses, as an anode electrolyte solution, a specific example containing an iron redox material and ethylenediaminetetraacetic acid, and a specific example containing an iron redox material and citric acid. Moreover, Patent Document 2 discloses, as an anode electrolyte solution, a specific example containing a titanium redox material and citric acid, a specific example containing a titanium redox material and ethylenediaminetetraacetic acid, a specific example containing a chromium redox material and ethylenediaminetetraacetic acid, and a specific example containing a chromium redox material and phosphoric acid. Non-Patent Document 1 discloses, as an anode electrolyte solution, a specific example containing an iron redox material and ethylenediaminetetraacetic acid, a specific example containing an iron redox material and citric acid, and a specific example containing an iron redox material and oxalic acid.

PRIOR-ART DOCUMENTS

Patent Documents

Patent Document 1: Japanese Patent Application Publication No. Sho 56-42970.
Patent Document 2: Japanese Patent Application Publication No. Sho 57-9072.

Non-Patent Document

Non-Patent Document 1: Y. H. Wen et al., "Study on Iron $(Fe^{3+}/Fe^{2+})$-Complex/Bromine $(Br_2/Br^-)$ Redox Flow Cell in Sodium Acetate Solution", *Journal of the Electrochemical Society*, 153(5) A929-A934 (2006).

SUMMARY OF THE INVENTION

Problems to Be Solved by the Invention

In general, an electricity storage battery utilizes a strongly acidic electrolyte solution. Because a metal redox ion is dissolved in a strongly acidic electrolyte solution stably even in a relatively higher concentration, the energy density of the battery can be raised. Moreover, in a strongly acidic electrolyte solution, the carrier of the ionic conduction is $H^+$ ion or $OH^-$ ion. Since any of the mobility of $H^+$ ion and the mobility of $OH^-$ ion is relatively higher, the conductivity of the strongly acidic electrolyte solution is higher. Thereby, the resistance of the battery is lowered so that the efficiency of the battery is increased. In a case where such a strongly acidic electrolyte solution is used, the material constituting the redox flow battery is required to have a chemical resistance capable of resisting the electrolyte solution. Regarding this, for example, when an electrolyte solution of $pH \geq 3$ is used, the chemical resistance required by the material constituting the battery is lower so that the manufacture cost of the electricity storage battery can be reduced. However, in an electrolyte solution of $pH \geq 3$, the metal redox ion is difficult to dissolve stably. The drawback that the solubility of the metal redox ion becomes low in an electrolyte solution of $pH \geq 3$ may be compensated for by containing a chelating agent in the electrolyte solution to form a complex with the metal redox ion. However, regarding the electricity storage battery using a chelating agent, there has not been a report for its practical use so far.

Now, zinc is widely used as anodes of alkali batteries. Though a battery whose anode is composed of zinc is theoretically chargeable, an alkali battery is not designed in consideration of charging. Here, it is considered that a zinc redox material is advantageously used in an anode electrolyte solution of an electricity storage battery, as being relatively cheaper and having a low redox potential. However, it is not supposed that the basic constitution of an alkali battery that is typically presumed to be used as a primary battery as mentioned above is suitably applied to an electricity storage battery. Moreover, regarding an electricity storage battery using a zinc redox material, there has not been a report for its practical use so far.

For the above reasons, for the cases where a zinc redox material is used in an electricity storage battery, from the viewpoint of possibility of lowering the equipment cost and spread of the electricity storage battery, it is important to prevent use of a strongly acidic or strongly alkaline electrolyte solution as much as possible.

The invention is made in light of the above facts, having an object of providing an electricity storage battery in which a zinc redox material can be easily used in the electrolyte solution even when the electrolyte solution has a pH close to the value of neutrality.

Means for Solving the Problems

In order to achieve the above object, an aspect of the invention is to provide an electricity storage battery that includes an anode electrolyte solution containing a zinc redox material and an amine represented by a general formula (1):

In the general formula (1), n is one of the integers 0 to 4, and each of $R^1$, $R^2$, $R^3$ and $R^4$ independently represents hydrogen, methyl or ethyl.

The "redox material" described in this application refers to a metal ion, a metal complex ion or a metal formed through a redox reaction of metal.

In the above electricity storage battery, the amine preferably contains at least one selected from diethylenetriamine, triethylenetetramine and N,N'-dimethylethylenediamine.

In the above electricity storage battery, the molar ratio of the amine to the zinc redox material in the anode electrolyte solution is preferably in the range of 1 to 5.

In the above electricity storage battery, the content of the zinc redox material in the anode electrolyte solution is preferably in the range of 0.2 mol/L to 2.0 mol/L.

In the above electricity storage battery, the pH of the anode electrolyte solution is preferably in the range of 3 to 11.

DESCRIPTION OF THE EMBODIMENTS

A redox flow battery as an electricity storage battery according to an embodiment of the invention will be described below

[Structure of Redox Flow Battery]

Figure 1:
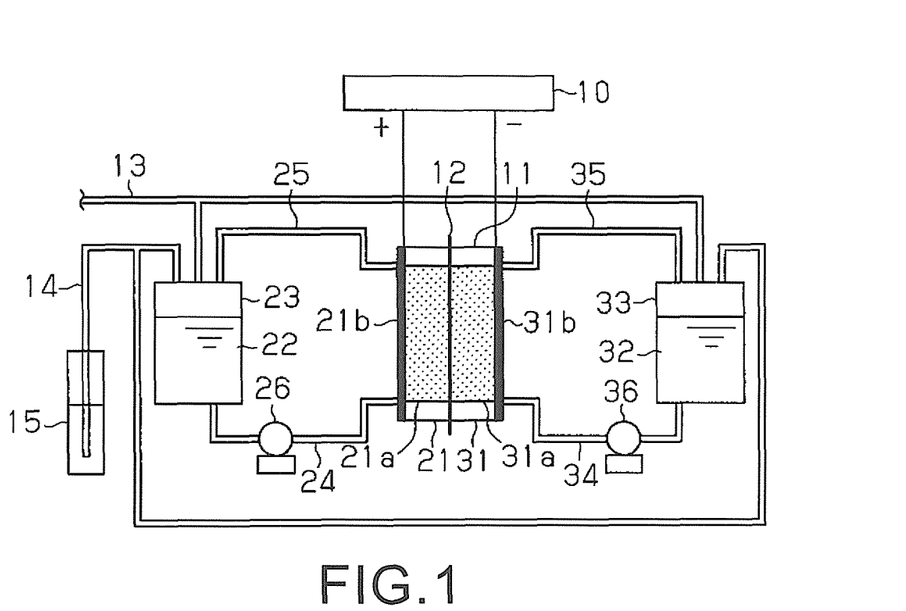
FIG. 1 schematically illustrates a redox flow battery according to an embodiment of the invention.

As shown in FIG. 1, the redox flow battery includes a charge/discharge cell 11. Inside the charge/discharge cell 11 is divided into a cathode cell 21 and an anode cell 31 by a diaphragm 12. The redox flow battery has a cathode electrolyte tank 23 storing the cathode electrolyte solution 22 used in the cathode cell 21, and an anode electrolyte tank 33 storing the anode electrolyte solution 32 used in the anode cell 31. In the redox flow battery, if required, a temperature regulator regulating the peripheral temperature of the charge/discharge cell 11 may be disposed.

The cathode cell 21 is configured such that the cathode 21a contacts with a cathode collector plate 21b. The anode cell 31 is configured such that the anode 31a contacts with an anode collector plate 31b. The cathode 21a and the anode 31a may be composed of, e.g., carbon felts. The cathode collector plate 21b and the anode collector plate 31b may be composed of, e.g., glassy carbon plates. The respective collector plates 21b and 31b are electrically connected to a charge/discharge apparatus 10.

The cathode cell 21 is connected to the cathode electrolyte tank 23 via a supply pipe 24 and a recycle pipe 25. The supply pipe 24 is equipped with a pump 26. By the operation of the pump 26, the cathode electrolyte solution 22 in the cathode electrolyte tank 23 is supplied to the cathode cell 21 through the supply pipe 24. Meanwhile, the cathode electrolyte solution 22 in the cathode cell 21 is recycled to the cathode electrolyte tank 23 through the recycle pipe 25. The cathode electrolyte solution 22 is thus circulated between the cathode electrolyte tank 23 and the cathode cell 21.

The anode cell 31 is connected to the anode electrolyte tank 33 via a supply pipe 34 and a recycle pipe 35. The supply pipe 34 is equipped with a pump 36. By the operation of the pump 36, the anode electrolyte solution 32 in the anode electrolyte tank 33 is supplied to the anode cell 31 through the supply pipe 34. Meanwhile, the anode electrolyte solution 32 in the anode cell 31 is recycled to the anode electrolyte tank 33 through the recycle pipe 35. The anode electrolyte solution 32 is thus circulated between the anode electrolyte tank 33 and the anode cell 31.

To the charge/discharge cell 11, the cathode electrolyte tank 23 and the anode electrolyte tank 33, an inert gas supply pipe 13 is connected to supply an inert gas from an inert gas generation apparatus. By supplying the inert gas to the cathode electrolyte tank 23 and the anode electrolyte tank 33 through the inert gas supply pipe 13, contact of the cathode electrolyte solution 22 and the anode electrolyte solution 32 with the oxygen in the atmosphere is inhibited. As the inert gas, for example, nitrogen gas is used. The inert gas supplied to the cathode electrolyte tank 23 and the anode electrolyte tank 33 is exhausted through an exhaust pipe 14. At the exhaust-side tip of the exhaust pipe 14, a water-seal part 15 is disposed to water-seal the opening of the exhaust pipe 14. The water-seal part 15 prevents the atmosphere from flowing backward into the exhaust pipe 14, and maintains a constant pressure in the cathode electrolyte tank 23 and the anode electrolyte tank 33.

During the charging, an oxidation reaction occurs in the cathode electrolyte solution 22 in contact with the cathode 21a, and a reduction reaction occurs in the anode electrolyte solution 32 in contact with the anode 31a. That is, the cathode 21a releases electrons and the anode 31a receives electrons. Meanwhile, the cathode collector plate 21b supplies the electrons released from the cathode 21a to the charge/discharge apparatus 10, and the anode collector plate 31b supplies the electrons received from the charge/discharge apparatus 10 to the anode 31a.

During the discharging, a reduction reaction occurs in the cathode electrolyte solution 22 in contact with the cathode 21a, and an oxidation reaction occurs in the anode electrolyte solution 32 in contact with the anode 31a. That is, the cathode 21a receives electrons and the anode 31a releases electrons. Meanwhile, the cathode collector plate 21b supplies the electrons received from the charge/discharge apparatus 10 to the cathode 21a, and the anode collector plate 31b collects the electrons released from the anode 31a and supplies the same to the charge/discharge apparatus 10.

[Electrolyte Solution]

The redox flow battery includes an anode electrolyte solution 32 containing a zinc redox material and an amine.

Zinc functions as an active material in the anode electrolyte solution 32. For example, it is supposed that reduction of Zn(II) to Zn(0) occurs during the charging and oxidation of Zn(0) to Zn(II) occurs during the discharging.

In view of raising the energy density, the concentration of the zinc redox material (zinc ion) in the anode electrolyte solution 32 is preferably not less than 0.2 mol/L, more preferably not less than 0.3 mol/L, and even more preferably not less than 0.4 mol/L. The concentration of the zinc redox material (zinc ion) in the anode electrolyte solution 32 is preferably not more than 2.0 mol/L.

The amine contained in the anode electrolyte solution 32 is represented by the following general formula (1).

(1)

In the general formula (1), n is one of the integers 0 to 4, and each of $R^1$, $R^2$, $R^3$ and $R^4$ independently represents hydrogen, methyl or ethyl.

The amine represented by the general formula (1) is a kind of chelating agent, being capable of forming a complex with the zinc redox material. Thus, when a zinc redox material is used in the anode electrolyte solution 32, there is, for example, the effect of stabilizing the redox reaction.

Examples of the amine represented by the general formula (1) are, e.g., ethylenediamine (EDA, n=0), diethylenetriamine (DETA, n=1), triethylenetetramine (TETA, n=2), tetraethylenepentamine (TEPA, n=3), pentaethylenehexamine (PEHA, n=4), tetramethylethylenediamine (TMEDA, n=0), N-methylethylenediamine (n=0), N,N'-dimethylethylenediamine (DMEDA, n=0), N,N-dimethylethylenediamine (n=0), N-ethyl ethylenediamine (n=0), N,N'-diethylethylenediamine (n=0), and N,N-diethylethylenediamine (n=0).

The anode electrolyte solution 32 may contain only one kind of amine represented by the general formula (1), or may contain a plurality of kinds of such amines.

The anode electrolyte solution 32 preferably contains at least one kind of amine selected from diethylenetriamine, triethylenetetramine and N,N'-dimethylethylenediamine.

The molar ratio of the amine represented by the general formula (1) to the zinc redox material in the anode electrolyte solution 32 is preferably in the range of 1 to 5, and more preferably in the range of 1.5 to 5. When the molar ratio is not less than 1, the concentration of the zinc redox material can be easily increased. When the molar ratio is not more than 5, the reactivity or the charge/discharge cycle characteristic (reversibility) tends to increase.

The pH of the anode electrolyte solution 32 is preferably in the range of 3 to 11. When the pH of the anode electrolyte solution 32 is not less than 3, the concentration of the zinc redox material can be easily increased. When the pH of the anode electrolyte solution 32 is not more than 11, it is possible to reduce the requirement on the chemical resistance of the material constituting the battery. Moreover, the pH is, for example, a value measured at 20° C.

If required, the anode electrolyte solution 32 may also include, e.g., an inorganic acid salt or an organic acid salt, or a chelating agent other than the amine represented by the general formula (1).

The active material used in the cathode electrolyte solution 22 is not particularly limited. Examples thereof include an iron redox material, a chromium redox material, a manganese redox material, a copper redox material, a vanadium redox material, and a bromine redox material.

In view of raising the energy density, the concentration of the metal redox material (metal ion) in the cathode electrolyte solution 22 is preferably not less than 0.1 mol/L, more preferably not less than 0.2 mol/L, and even more preferably not less than 0.4 mol/L.

In view of inhibiting separation of the metal redox material, the concentration of the metal redox material (metal ion) in the cathode electrolyte solution 22 is preferably not more than 2.5 mol/L, and more preferably not more than 1.5 mol/L.

As the active material used in the cathode electrolyte solution 22, for example, a manganese redox material is preferred. When containing manganese in the cathode electrolyte solution 22, it is preferred to dissolve, for example, manganese sulfate in water in order to prevent mixing-in of chloride ion. With respect to the manganese contained in the cathode electrolyte solution 22, it is supposed that oxidation of Mn(III) to Mn(IV) occurs during the charging and reduction of Mn(IV) to Mn(III) occurs during the discharging.

It is preferred that the cathode electrolyte solution 22 further contains a chelating agent. Examples of the chelating agent include, e.g., an amine represented by the general formula (1), polyethyleneimine, and an aminocarboxylic chelating agent.

The molar ratio of the chelating agent to the metal redox material in the cathode electrolyte solution 22 is preferably in the range of 0.5 to 10, and more preferably in the range of 1 to 5.

If required, the cathode electrolyte solution 22 may also contain, for example, an inorganic acid salt or an organic acid salt.

The pH of the cathode electrolyte solution 22 is preferably in the range of 3 to 11.

The anode electrolyte solution 32 and the cathode electrolyte solution 22 can be prepared with well-known methods. When containing the zinc redox material in the anode electrolyte solution 32, it is preferred to dissolve zinc sulfate ($ZnSO_4$) in water, in view of for example, the availability.

The water used for the anode electrolyte solution 32 and the cathode electrolyte solution 22 is preferably distilled water or water having the same or a higher level of purity. The redox flow battery is preferably charged and discharged while the anode electrolyte solution 32 and the cathode electrolyte solution 22 are under an inert gas atmosphere.

[Function of Redox Flow Battery]

In the anode electrolyte solution 32 containing the zinc redox material and the amine represented by the general formula (1), it is supposed that the redox reaction of the zinc redox material is stabilized because the zinc redox material and the amine form a complex. Thereby, practical performance of the battery as a redox flow battery can be easily obtained.

The performance of a redox flow battery can be evaluated according to, for example, the charge/discharge cycle characteristic (reversibility), coulombic efficiency, voltage efficiency, energy efficiency, electrolyte solution utilization ratio, electromotive force, and potential of electrolyte solution. Hereinafter, one time of charging and discharging of the redox flow battery is called "one cycle."

The charge/discharge cycle characteristic (reversibility) is calculated by substituting the coulombic amount (A) of the discharging in the $5^{th}$ cycle and the coulombic amount (B) of the discharging in the $100^{th}$ cycle in the following Eq. (1).

$$\text{Charge/discharge cycle characteristic [\%]}=B/A\times 100 \quad (1)$$

The charge/discharge cycle characteristic is preferably 80% or more.

The coulombic efficiency is calculated by substituting the coulombic amount (C) of charging and the coulombic amount (D) of discharging in a given cycle in the following Eq. (2).

$$\text{Coulombic efficiency [\%]}=D/C\times 100 \quad (2)$$

The coulombic efficiency, in terms of the value calculated from the coulombic amounts in the $79^{th}$ cycle, for example, is preferably 80% or more.

The voltage efficiency is calculated by substituting the average terminal voltage (E) of charging and the average terminal voltage (F) of discharging in a given cycle in Eq. (3) below.

$$\text{Voltage efficiency [\%]}=F/E\times 100 \quad (3)$$

The voltage efficiency, in terms of the value calculated from the terminal voltages in the $79^{th}$ cycle, for example, is preferably 60% or more.

The energy efficiency is calculated by substituting the electricity amount (G) of charging and the electricity amount (H) of discharging in a given cycle in the following Eq. (4).

$$\text{Energy efficiency [\%]} = H/G \times 100 \quad (4)$$

The energy efficiency, in terms of the value calculated from the electricity amounts in the $79^{th}$ cycle, is preferably 60% or more.

The electrolyte solution utilization ratio is calculated by multiplying the molar number of the active material in the electrolyte solution supplied from the side of the cathode 21a or the anode 31a with the Faraday constant (96500 coulombs/mol) to obtain a coulombic amount (I), obtaining the coulombic amount (J) of the charging in the first cycle, and then substituting the coulombic amount (I) and the coulombic amount (J) in the following Eq. (5). Moreover, in a case where the molar number of the active material in the electrolyte solution supplied from the side of the cathode 21a is different from the molar number of the active material in the electrolyte solution supplied from the side of the anode 31, the smaller molar number is adopted.

$$\text{Electrolyte solution utilization ratio [\%]} = J/I \times 100 \quad (5)$$

The electrolyte solution utilization ratio, in terms of the value calculated from the coulombic amounts in the $1^{st}$ cycle, is preferably 35% or more.

The electromotive force is the terminal voltage at the switching from charging to discharging (when the current is 0 mA) in a given cycle.

The electromotive force, in terms of the terminal voltage in the $1^{st}$ cycle, is preferably 1.0 V or more.

With the embodiment described above, the following effects are made.

First, the redox flow battery of this embodiment includes the anode electrolyte solution 32 that contains the zinc redox material and the amine represented by the general formula (1). In such cases, it is supposed that the redox reactions of the zinc redox material are stabilized. Thereby, even if the pH of the electrolyte solution is close to the value of neutrality, the zinc redox material still can be easily used in the electrolyte solution.

Second, it is preferred that the anode electrolyte solution 32 contains at least one kind of amine selected from diethylenetriamine, triethylenetetramine and N,N'-dimethylethylenediamine. In such cases, self-discharging is easy to inhibit and the charge/discharge cycle characteristic is improved so that the redox flow battery is more highly suitable for practical use. Though the mechanism thereof is not clear, it is supposed that the above amine forms a more stable complex with the zinc redox material as being a relatively lower molecule and having one or more secondary amine structures represented by "C—NH—C" in the molecule.

Third, the molar ratio of the amine represented by the general formula (1) to the zinc redox material in the anode electrolyte solution 32 is preferably in the range of 1 to 5. In such cases, it is supposed that the redox reactions of the zinc redox material are easily stabilized. Hence, even if the pH of the electrolyte solution is close to the value of neutrality, the zinc redox material still can be easily used in the electrolyte solution.

Fourth, the content of the zinc redox material in the anode electrolyte solution 32 is in the range of 0.2 mol/L to 2.0 mol/L, so that the energy density can be increased and the solubility of the zinc redox material is easy to maintain.

Fifth, the pH of the anode electrolyte solution 32 is preferably in the range of 3 to 11, so that the corrosion resistance is easy to maintain and the solubility of the zinc redox material is easy to maintain.

Sixth, after repeated charging/discharging, the zinc redox material may form a dendrite (tree-shaped crystal). If such dendrite grows, the diaphragm 12 may be penetrated causing an internal short circuit. Regarding this, among the amines represented by the general formula (1), for example, diethylenetriamine and triethylenetetramine have an effect of inhibiting formation or growth of the dendrite. It is considered that good charge/discharge cycle characteristic can be obtained due to the effect.

Seventh, it is preferred to dissolve zinc sulfate in water in order to contain the zinc redox material in the anode electrolyte solution 32. In such cases, since zinc sulfate is easy to acquire, the anode electrolyte solution 32 can be easily obtained. Moreover, as compared to, for example, a case where zinc chloride is used, mixing-in of chloride ion as a key factor of chlorine gas generation at the cathode can be easily inhibited. However, in a case where generation of chlorine gas or bromine gas at the cathode is not a problem, zinc chloride or zinc bromide can also be used.

(Modified Embodiments)

The above embodiment may be subjected to the following modifications.

The shape, arrangement and number of the charge/discharge cell 11 included in the redox flow battery or the volumes of the cathode electrolyte tank 23 and anode electrolyte tank 33 may be changed according to the performance and so on that are required by the redox flow battery. Moreover, the amounts of the cathode electrolyte solution 22 and the anode electrolyte solution 32 supplied to the charge/discharge cell 11 may also be set according to, for example, the volume of the charge/discharge cell 11 and so on.

An electricity storage battery other than a redox flow battery is also possible.

EXAMPLES

The invention will be described in details with Examples and Comparative Example.

[Solubility Test of Zn(II)-Amine Complex]

In 50 mL of distilled water was dissolved 0.2 mol (29.2 g) of triethylenetetramine (TETA, molecular weight=146.2). After 0.1 mol (28.75 g) of $ZnSO_4 \cdot 7H_2O$ was dissolved in the aqueous solution, distilled water was added such that the total amount became 90 mL. Next, the aqueous solution was stirred until $ZnSO_4$ was completely dissolved, and dilute sulfuric acid of 2.5 mol/L was added to adjust the pH to 6.5. Distilled water was added in the aqueous solution such that the total amount became 100 mL, so that an aqueous solution containing the Zn(II)-TETA complex in a concentration of 1.0 mol/L was prepared.

The obtained aqueous solution is placed still at room temperature (~25° C.) and under air for 10 days to perform a solubility test. As a result, no precipitate was identified therein. That is, the solubility of the Zn(II)-TETA complex was 1.0 mol/L or more.

In the same manner, aqueous solutions different in the concentration of the Zn(II)-TETA complex or in the pH were prepared, and the solubility test was conducted on them. The result thereof is shown in FIG. 2.

Figure 2:
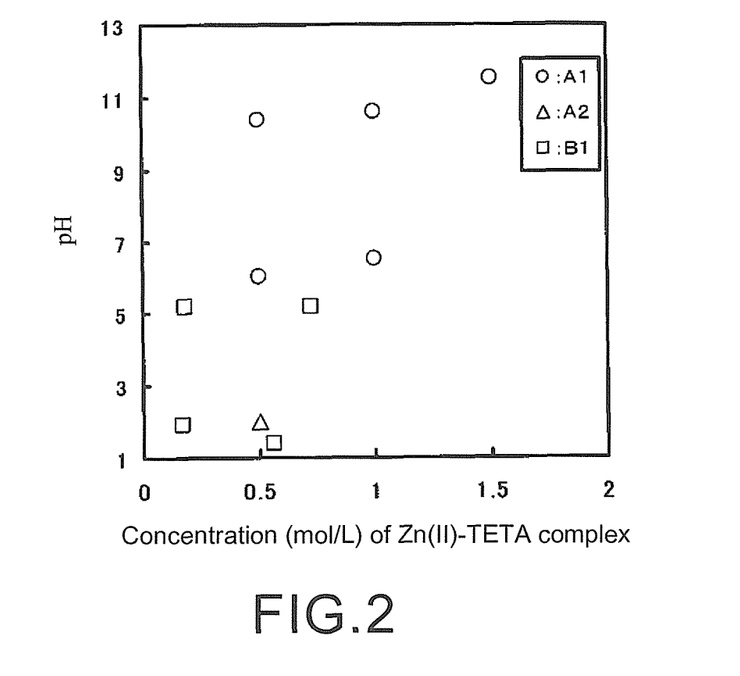
FIG. 2 is a graph showing the result of a solubility test of a Zn(II)-amine complex.

In FIG. 2, the plot A1 corresponds to the aqueous solutions with a molar ratio of Zn to TETA of 1:2 in which no precipitate was identified in the solubility test, and the plot A2 corresponds to the aqueous solutions with a molar ratio of Zn to TETA of 1:2 in which precipitates were identified in the solubility test.

The plot B1 in FIG. 2 corresponds to the aqueous solutions with a molar ratio of Zn to TETA of 1:1 in which no precipitate was identified in the solubility test As shown in FIG. 2, the solubility of the Zn(II)-TETA complex was maintained even when the pH of the aqueous solution was 3 or more. It is therefore understood that the value of being utilized as an electrolyte solution of a redox flow battery is high.

Example 1

<Redox Flow Battery>

Carbon felts (trade name: GFA5, produced by SGL Group) were used as the cathode and the anode, and the electrode area was set to 10 cm$^2$. Pure titanium of 0.6 mm thick was used as the cathode collector plate. A glassy carbon plate (trade name: SG Carbon, 0.6 mm thick, made by Showa Denko K. K.) was used as the anode collector plate. A cation-exchange membrane (CMS, produced by ASTOM Corporation) was used as the diaphragm.

Glass containers having a volume of 30 mL were used as the cathode electrolyte tank and the anode electrolyte tank. Silicone tubes were used as the supply pipe, the recycle pipe, the inert gas supply pipe and the exhaust pipe. A micro-tube pump (MP-1000, made by Tokyo Rikakikai Co., Ltd.) was used as the pump. A charge/discharge battery test system (PFX200, made by Kikusui Electronics Corp.) was used as the charge/discharge apparatus.

<Preparation of Aqueous Solution of Mn(II)-TETA Complex>

In 50 mL of distilled water was dissolved 0.02 mol (2.92 g) of triethylenetetramine (TETA). Dilute sulfuric acid of 2.5 mol/L was added to the aqueous solution to adjust the pH to 6. After 0.02 mol (3.38 g) of MnSO$_4$.H$_2$O was dissolved in the aqueous solution, 0.05 mol (7.1 g) of Na$_2$SO$_4$ was dissolved. Next, dilute sulfuric acid of 2.5 mol/L was added to the aqueous solution to adjust the pH to 5, and distilled water was added such that the total amount became 100 mL. Thereby, an aqueous solution containing the Mn(II)-TETA complex in a concentration of 0.2 mol/L was obtained.

<Preparation of Aqueous Solution of Zn(II)-TETA Complex>

In 50 mL of distilled water was dissolved 0.04 mol (5.84 g) of triethylenetetramine (TETA). After 0.02 mol (5.75 g) of ZnSO$_4$.7H$_2$O was dissolved in the aqueous solution, 0.05 mol (7.1 g) of Na$_2$SO$_4$ was dissolved. Next, dilute sulfuric acid of 2.5 mol/L was added to the aqueous solution to adjust the pH to 6, and distilled water was added such that the total amount became 100 mL. Thereby, an aqueous solution containing the Zn(II)-TETA complex in a concentration of 0.2 mol/L was obtained.

<Electrolytic Oxidation of Aqueous Solution of Mn(II)-TETA Complex>

The above redox flow battery was used to perform electrolytic oxidation on the aqueous solution of the Mn(II)-TETA complex to prepare a cathode electrolyte solution. At first, 20 mL of the aqueous solution of the Mn(II)-TETA complex was loaded in the cathode electrolyte tank, and 20 mL of the aqueous solution of Zn(II)-TETA complex was loaded in the anode electrolyte tank. Next, the redox flow battery was charged in a constant current of 100 mA for 60 min (386 coulombs in total).

Thus, the Mn(II)-TETA complex contained in the aqueous solution loaded in the cathode electrolyte tank was electrolytically oxidized to prepare an aqueous solution of Mn(III)-TETA complex having a concentration of 0.2 mol/L that would serve as a cathode electrolyte solution. Moreover, "Mn(III)" is described herein because it is considered that trivalent manganese ion was formed due to the electrolytic oxidation of divalent manganese ion, but the detail about the valence number is unclear.

<Charge/Discharge Test>

The aqueous solution of the Mn(III)-TETA complex obtained with the electrolytic oxidation reaction was used as a cathode electrolyte solution and the aqueous solution of Zn(II)-TETA complex used as an anode electrolyte solution to perform a charge/discharge test. The charge/discharge test began with charging, and the charging was conducted in a constant current of 100 mA for 30 min (180 coulombs in total). Next, discharging was performed in a constant current of 100 mA until a discharging termination voltage 0.6 V was reached. After a rest of 10 minutes after the discharging, charging was performed again under the same condition.

The above charging and discharging are taken as one cycle and repeated for 100 cycles.

The redox reactions occurred in the charging/discharging are supposed to be as follows.

Figure 3:
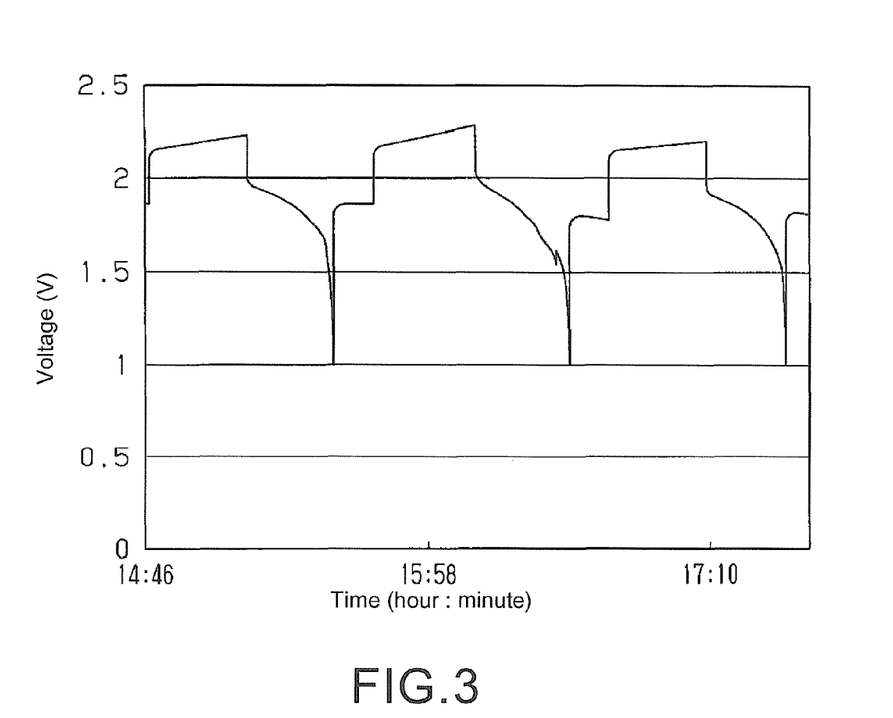
FIG. 3 is a graph showing a relationship of voltage versus time as the result of the charge/discharge test in Example 1.

The transition of the battery voltage from the 77$^{th}$ charge/discharge cycle to the 79$^{th}$ cycle is shown in FIG. 3.

From the charge/discharge test, the charge/discharge cycle characteristic (reversibility), coulombic efficiency, voltage efficiency, energy efficiency, electrolyte solution utilization ratio, and electromotive force were derived.

The charge/discharge cycle characteristic (reversibility) was derived from the coulombic amount (A) of the discharging in the 5$^{th}$ cycle and the coulombic amount (B) of the discharging in the 100$^{th}$ cycle.

The coulombic efficiency was derived from the coulombic amounts in the 79$^{th}$ cycle.

The voltage efficiency was derived from the average terminal voltages in the 79$^{th}$ cycle.

The energy efficiency was derived from the electricity amount in the 79$^{th}$ cycle.

The electrolyte solution utilization ratio was derived from the coulombic amount in the 1$^{st}$ cycle.

The electromotive force was derived from the terminal voltage in the 1$^{st}$ cycle.

The above results are shown in Table 1.

TABLE 1

| Result of charge/discharge test | Example 1 |
| --- | --- |
| Charge/discharge cycle characteristic (%) | 126 |
| Coulombic efficiency (%) | 96 |
| Voltage efficiency (%) | 80 |
| Energy efficiency (%) | 77 |
| Electrolyte solution utilization ratio (%) | 37 |
| Electromotive force (V) | 2.06 |

It is clear form the result of the charge/discharge test shown in Table 1 that good battery characteristics were obtained in Example 1.

<Observation of the Anode Using a Scanning Electron Microscope>

After the above charge/discharge test, a scanning electron microscope was used to observe the state of the anode. The SEM pictures thereof are shown in FIGS. 4 to 6.

Figure 4:
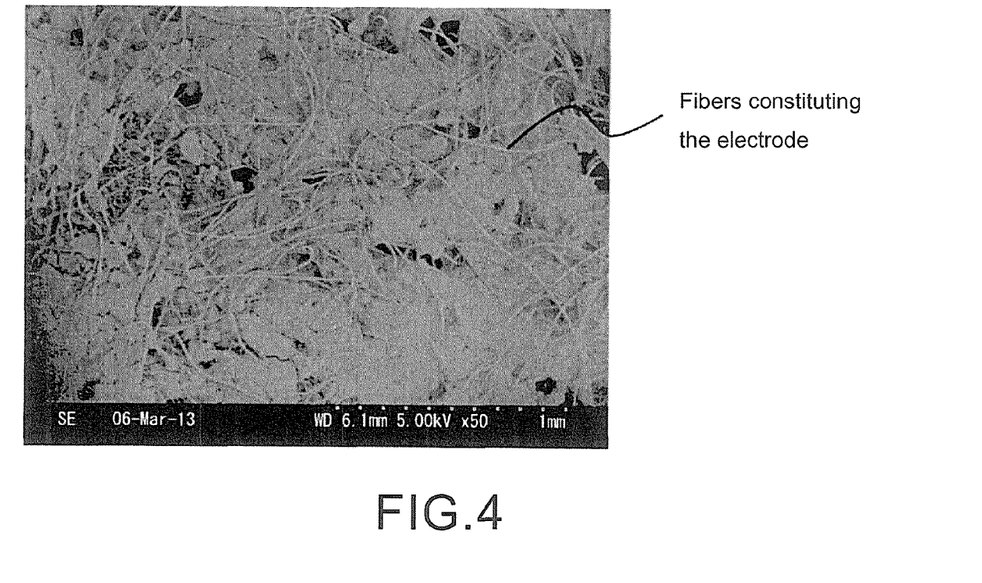
FIG. 4 is a 50×SEM (scanning electron microscope) picture of the anode after the charge/discharge test of Example 1.
Figure 5:
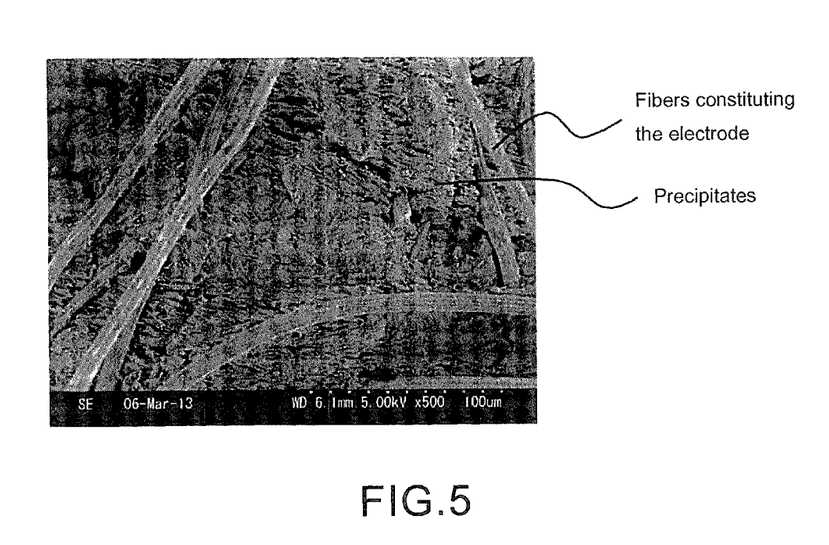
FIG. 5 is a 500×SEM picture of the anode after the charge/discharge test of Example 1.
Figure 6:
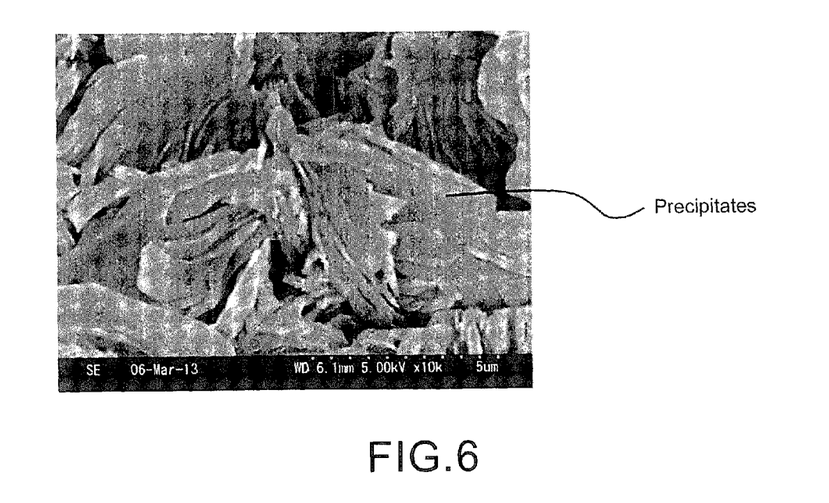
FIG. 6 is a 10,000×SEM picture of the anode after the charge/discharge test of Example 1.

As shown in FIGS. 4 and 5, precipitates containing zinc were identified between the carbon fibers constituting the electrode. As shown in FIG. 6, the shape of the precipitates was a plate shape, and no dendrite was identified.

Example 2

In Example 2, a cathode electrolyte solution as obtained in Example 1 was used, and an aqueous solution of Zn(II)-DETA complex in a concentration of 0.2 mol/L was prepared in the same manner of Example 1 except that TETA was replaced by diethylenetriamine (DETA) in preparing the Zn(II) complex solution, and was used as an anode electrolyte solution. In Example 2, a charge/discharge test was also conducted as in Example 1, and the result showed that the same battery characteristics as in Example 1 were obtained.

Example 3

In Example 3, a cathode electrolyte solution as obtained in Example 1 was used, and an aqueous solution of Zn(II)-TEPA complex in a concentration of 0.2 mol/L was prepared in the same manner of Example 1 except that TETA was replaced by tetraethylenepentamine (TEPA) in preparing the Zn(II) complex solution, and was used as an anode electrolyte solution. In Example 3, a charge/discharge test was also conducted as in Example 1, and the result showed that the coulombic efficiency became about 0% approximately in the 30$^{th}$ charge/discharge cycle and accordingly the anode electrolyte solutions of Example 1 and Example 2 were advantageous over the anode electrolyte solution of Example 3.

Comparative Example 1

<Preparation of Aqueous Mn(II) Solution>

In 50 mL of distilled water was dissolved 0.02 mol (3.38 g) of $MnSO_4 \cdot H_2O$, and then 0.05 mol (7.1 g) of $Na_2SO_4$ was dissolved. Next, 32 mL of dilute sulfuric acid of 2.5 mol/L was added, and distilled water was added such that the total amount became 100 mL. Thereby, an aqueous solution containing Mn(II) in a concentration of 0.2 mol/L and having a pH of 1.2 was obtained.

<Preparation of Aqueous Zn(II) Solution>

In 50 mL of distilled water was dissolved 0.02 mol (5.75 g) of $ZnSO_4 \cdot 7H_2O$, and then 0.05 mol (7.1 g) of $Na_2SO_4$ was dissolved. Next, 32 mL of dilute sulfuric acid of 2.5 mol/L was added, and distilled water was added such that the total amount became 100 mL. Thereby, an aqueous solution containing Zn(II) in a concentration of 0.2 mol/L and having a pH of 1.1 was obtained.

<Charge/Discharge Test>

The above aqueous Mn(II) solution was used as a cathode electrolyte solution and 20 mL of the above aqueous Zn(II) solution used as an anode electrolyte solution to perform a charge/discharge test as in Example 1. That is, as in Example 1, the charging was conducted in a constant current of 100 mA for 30 min, and then discharging was performed in a constant current of 100 mA until a discharging termination voltage 0.6 V was reached. Such charging and discharging were performed for 16 cycles, and in all the charge/discharge cycles, the coulombic efficiency was 3% or less, and the discharging time was shorter than 1 min. Accordingly, in Comparative Example 1, practical battery characteristics were not obtained.

The invention claimed is:

1. An electricity storage battery, comprising:
an anode electrolyte solution, containing: a zinc redox material, and an amine represented by a general formula (1):

wherein in the general formula (1), n is one of integers 0 to 4, and each of $R^1$, $R^2$, $R^3$ and $R^4$ independently represents hydrogen, methyl or ethyl.

2. The electricity storage battery of claim 1, wherein the amine contains at least one of diethylenetriamine, triethylenetetramine and N,N'-dimethylethylenediamine.

3. The electricity storage battery of claim 1, wherein a molar ratio of the amine to the zinc redox material in the anode electrolyte solution is in a range of 1 to 5.

4. The electricity storage battery of claim 1, wherein a content of the zinc redox material in the anode electrolyte solution is in a range of 0.2 mol/L to 2.0 mol/L.

5. The electricity storage battery of claim 1, wherein pH of the anode electrolyte solution is in a range of 3 to 11.

* * * * *